Jan. 9, 1968    J. W. BALET    3,363,208
STUD FINDING DEVICE
Filed Feb. 14, 1967    2 Sheets-Sheet 1

INVENTOR.
JOSEPH W. BALET
BY
ATTORNEYS.

Jan. 9, 1968   J. W. BALET   3,363,208
STUD FINDING DEVICE
Filed Feb. 14, 1967   2 Sheets-Sheet 2

INVENTOR.
JOSEPH W. BALET
BY
ATTORNEYS

United States Patent Office 3,363,208
Patented Jan. 9, 1968

3,363,208
STUD FINDING DEVICE
Joseph W. Balet, 521 3rd Ave., Pelham, N.Y. 10803
Filed Feb. 14, 1967, Ser. No. 622,873
12 Claims. (Cl. 335—285)

ABSTRACT OF THE DISCLOSURE

The present invention relates to a stud finding device wherein an elongated multiple magnetic sensor providing discernable deflection towards a nail head by one and generally two of a set of vertically mounted magnets pivotally mounted within the sensor.

---

The present invention relates to stud finding devices actuated by a magnetic sensing mechanism and is a continuation-in-part of my copending application Ser. No. 567,910, filed July 26, 1966.

In construction, the supporting studs of a wall or other beams are concealed once the wall is finished. In plasterboard walls this is usually accomplished by the driving of nails through the plasterboard wall to the supporting studs, recessing the nail heads and tape spackling over the nail heads before the wall is painted or finished.

Once completed it is difficult to locate the concealed beams or studs, and when it becomes necessary to locate the studs for a desired purpose, such as using the same as a foundation for mounting objects on the wall or other outer surface difficulty may be encountered, leading to, in many instances, unnecessary mutilation of the walls.

Stud finding devices utilizing magnetic attraction between a sensing mechanism and a concealed nail head were developed wherein the sensing mechanism would deflect inwards towards the nail head concealed in the wall. Once the nail head was located, the location of the stud was ascertained. It was oftentimes difficult and time consuming to employ such devices. Nails are normally placed from 6 to 8 inches apart along a stud. The devices of the past in use required a time consuming tracing along the wall to locate the nail head since the devices of the past could easily pass over the stud between two nails and not directly over any nail.

Additionally, once a nail head was located there was no assurance that the stud or beam located was a vertical beam, and if perchance the beam located was a cross beam and was not located at the desired height level sought, mutilation of the outer wall surface could occur by the attempted mounting where in fact no vertical beam existed.

It became necessary therefore to trace upward and/or downward in the area of the found nail head to insure that a vertical beam was located.

The present invention overcomes such shortcomings and a stud or beam may be located on the first pass and marked by the retention of the stud finder.

According to the present invention, a plurality of magnetic indicators are so situated so that at least one and most likely, at least two, will pass within sufficient proximity to a nail head or nail heads to cause a discernible deflection which may be visibly discernible by feel.

The side deflection embodiment of the present invention additionally overcomes the problems inherent in the inward deflection devices of the prior art. In devices where-in the sensing mechanism deflected inward towards the nail head, it was troublesome since the user had to be positioned so that his line of sight was on a level with the sensing mechanism so that the deflection would be discernible. The hit or miss passing of the devices of the past over a large wall or other surface area in search of a nail head was thereby made more difficult especially where the user could not position himself readily behind, above or below the devices of the past, such as in cases where a large object such as a piece of furniture was in front of the wall or other surface area. Many times it became necessary therefore to move these objects away from the wall in order to locate the stud or beam. The same problem of discerning was similarly found where the beam sought was in a corner.

By the provision of an elongated multiple sensor device, the present invention provides a greater line of sight range to a user, and where such is combined with side deflection sensors with a transparent casing, such problem is completely obviated.

Although such novel feature or features believed to be characteristic of the invention are pointed out in the claims, the invention and the manner in which it may be carried out may be further understood by reference to the description following and the accompanying drawings.

Referring now to the figures in greater detail, where like reference numbers denote like parts in the various figures.

Figure 1:
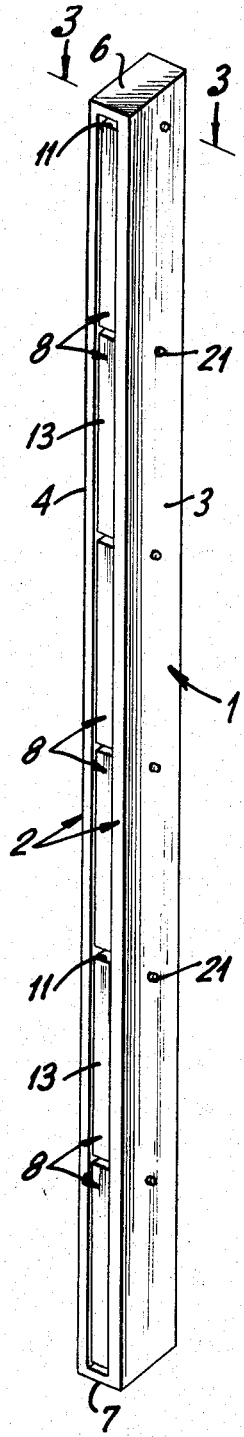
FIG. 1 is an isometric view of the stud finder of the present invention.
Figure 2:
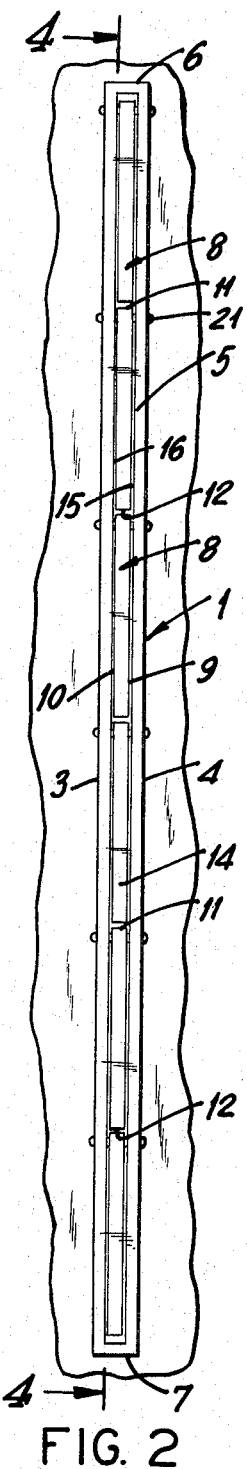
FIG. 2 is a plan view of FIG. 1.
Figure 3:
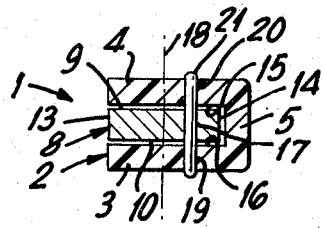
FIG. 3 is a cross-sectional view taken along lines 3—3 of FIG. 1.
Figure 4:
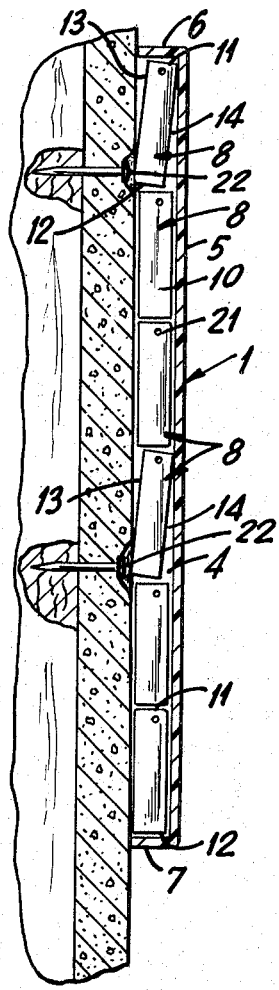
FIG. 4 is a cross-sectional view taken along lines 4—4 of FIG. 1.

Referring to FIGS. 1–4, the present invention comprises a body or channeled frame 1 formed in the manner of a U-shaped beam with a channel 2, side walls 3 and 4, a back wall 5 and closed ends at the top 6 and bottom 7. The body 1 may be integrally formed of a suitable rigid nonferrous and nonmagnetic material such as plastic, wood, aluminum or even magnesium, and may be fabricated of any suitable transparent material.

A series of permanent magnet bars 8, which may be of steel or other suitable material such as a plastic and ferrite construction, are shaped in the form of slabs with longitudinal faces 9 and 10 of a width less than that of the side walls 3 and 4 of the body 1, ends at the top 11 and bottom 12, and longitudinal edges 13 and 14 of a width less than the width of the channel 2.

The magnet bars 8 are emplaced within the channel 2 with sufficient clearance provided so that there will be no interference between the faces 9 and 10 and the internal walls 15 and 16 of the channel 2.

At the upper portion of each bar magnet 8, near the top 11, a round orifice 17 traverses the width of the magnet 8 from one face 9 to the opposite face 10. The orifice 17 traverses the width at a point distant from the longitudinal center of gravity line 18 of the bar magnet 8, so that if pivoted about orifice 17, the bar magnet 8 would come to rest in an angulated vertical position. The magnets 8 might be provided with indentations (not shown) adapted to rotate on protrusions (not shown) in U shaped declivity in lieu of rotation about a pin 21.

Mating orifices 19 and 20 are provided through the walls 3 and 4 of the body 1, so that when the magnet 8 is emplaced in the channel 2, the orifices may be properly aligned.

A cylindrical pin 21, of a length equal to the width of wall 5 of frame 1, and fabricated of a suitable rigid material is provided. The diameter of pin 21 being slightly smaller than the diameter of orifice 17 of magnet 8 and equal to or greater than the diameter of orifices 19 and 20 of walls 3 and 4.

The pin 21 is emplaced through orifice 18 of wall 3, orifice 17 of magnet 8 and orifice 19 of wall 4 and is held fast due to the fact that the diameter of said pin 21 is equal to or greater than the diameter of orifices 18 and 19.

A plurality of magnets 8 and pin 21 configurations are emplaced within the channel 2, said channel extending a length of at least 6 inches. The magnets 8 are so emplaced so as to provide sufficient lateral clearance so that each magnet 8 may freely pivot on each pin 21 and as to enable each magnet 8 to deflect if attracted to an object the size of a plasterboard nail head. A channel extending 12 inches is preferable.

Orifices 17, 19 and 20 are so aligned and positioned that when suspended by pin 21, each magnet 8 will rest angulated toward the back wall 5 of frame 1 completely within the U-shaped channel 2. The magnets 8 are aligned in polarized relationship which tends to maintain the magnets 8 in a straight line relationship when the stud finder of the present invention is in a vertical position.

In operation, the user, holding the stud finder in an upright vertical position with top end 6 at the highest elevation and back wall 5 away from the wall, draws the stud finder in a horizontal path across the plaster wall. As the stud finder passes a stud, ordinarily at least two nails 22 will draw a magnet 8 from its angulated position resting against back wall 5 toward the nails 22.

The motion of the magnetic indicator 8 may be observed visually if said back 5 is of a transparent substance or may be audibly detected or even detected by feel. The outward protrusion of the magnet 8 in most instances will stop the stud finder of the present invention as it is gently moved in its vertical position horizontally against the wall.

Figure 6:
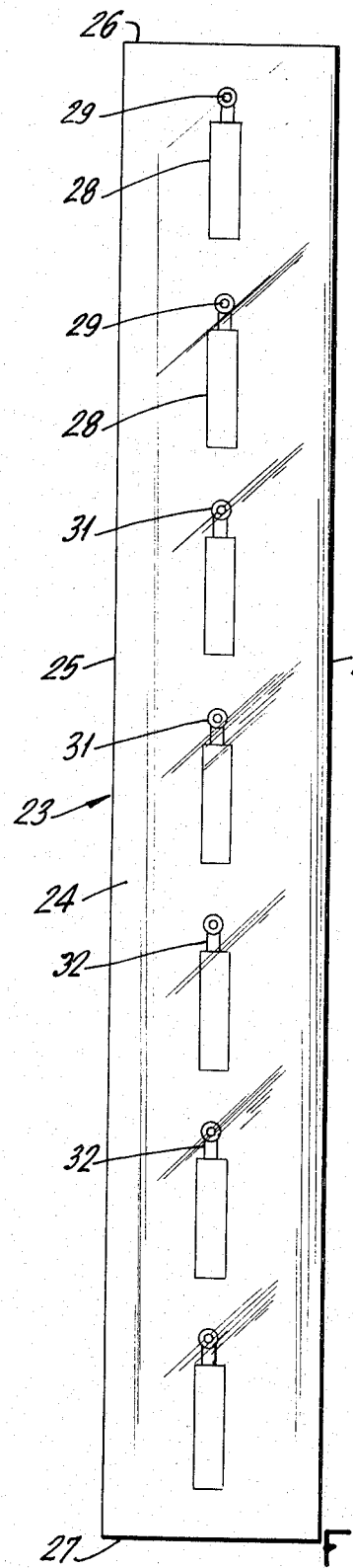
FIG. 6 is a front plan view of FIG. 5.
Figure 7:
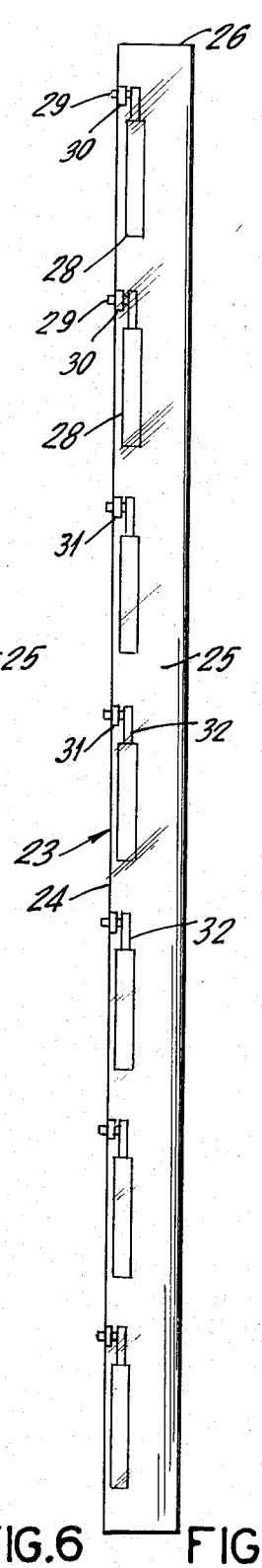
FIG. 7 is a side elevation of FIG. 5.
Figure 5:
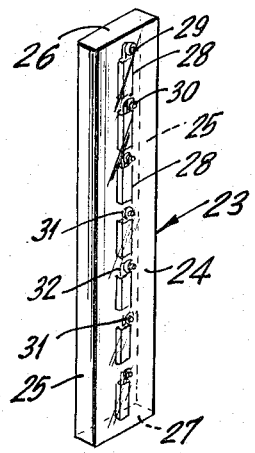
FIG. 5 is an isometric view of another embodiment of the present invention.
Figure 8:
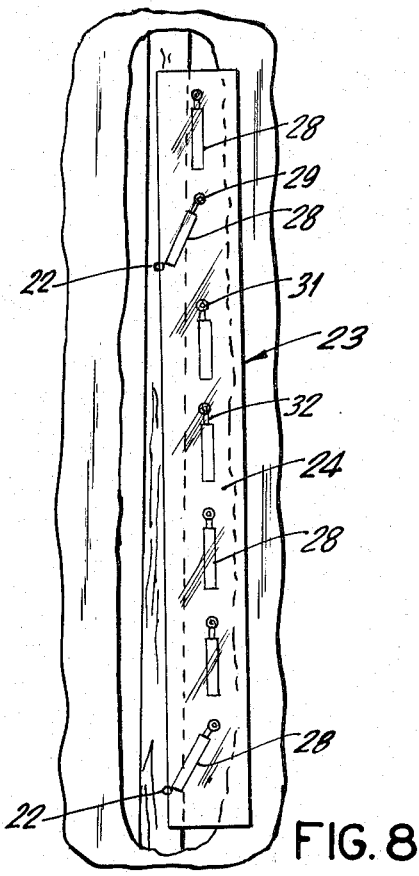
FIG. 8 is a plan view of FIG. 5 showing a wall and stud broken away.

As shown in FIGS. 5–8, an elongated body 23 is shown in rectangular form with a back wall 24 and side wall 25. Closed ends 26 and 27 may be provided on the top and bottom of the body 23. The body 23 may be integrally formed of a suitable rigid nonferrous, nonmagnetic material with back wall 24, preferably being of a transparent material.

A series of permanent bar magnets 28 of similar construction as magnets 8 of elongated substantially rectangular shape having a width less than the width of side walls 25 are pivotally mounted in longitudinal series to the inner surfaces of wall 24 on pins 29 positioned with orifices 30 in back wall 24.

A spacer 31 may be interposed between the inner surface of back wall 24 and magnets 28 so that magnets 28 will be held within the body 23 spaced apart from the back wall 24.

A strip 32 of nonmagnetic material such as plastic may be affixed to one end of magnet 28 and magnet 28 mounted on pin 29 through a transverse opening in the strip 32, the strip 32 acting as an interconnecting link between the magnet 28 and the pin 29.

When body 23 is in vertical position, magnets 28 depend vertically on pins 29, magnets 28 being able to pivot in a side-to-side manner between side walls 25. In order to prevent the complete rotation of magnets 28 about pins 29, the combined length of strip 32 and magnet 28 should exceed one half the width of back wall 24 so that magnets 28 will intersect a portion of side walls 25, side walls 25 acting as a stop for the side pivoting of magnets 28.

The magnets 28 are so mounted within the body 23 as to provide sufficient clearance so that each magnet 28 may freely pivot on each pin 29 as to enable each magnet 28 to deflect if attracted to an object the size of a nail head 22. A channel extending 12 inches is preferable so as to readily allow for the location of two nail heads 22 on a single pass of the device.

In operation, the user places the stud finder in upright vertical position so that the magnets 28 depend vertically on pins 29 with the back wall 24 spaced apart from the wall or other surface by side walls 25 which are juxtaposed to the wall or other surface. The stud finder is then drawn, preferably in a horizontal path, across the wall. As the stud finder approaches a stud, ordinarily at least two nail heads 22 will magnetically attract and laterally pivot two magnets 28 from their vertical position, angulating the said magnets 28 towards the nail heads 22.

The lateral motion of the magnets 28 is readily discernible from a variety of angles through the transparent back wall 24 giving the user a greater freedom of movement and allows the device of the present invention to be employed without undesirable rearrangement or repositioning of objects, such as furniture which may be in front of or blocking the user from close, direct proximity with the wall or other surface.

The side deflection of the magnets 28 themselves in most instances can be felt, that is the magnetic attraction acts as a drag to the entire stud finder and the user feeling such impediment of movement can locate nail heads 22 in such manner.

It is preferred for either embodiment, for the stud finder of the present invention to be approximately 12 inches long with each magnet slightly less than 2 inches in length. With these dimensions, the stud finder of the present invention is most likely to respond to at least two nails even if the nails are spaced 8 inches apart.

The terms and expressions which are employed are used as terms of description; it is recognized, though that various modifications are possible within the scope of the invention claimed.

Having thus described certain forms of the invention in some detail, what is claimed is:

1. A stud finder comprising an elongated body portion, said elongated body portion including a back wall and side walls, mounting means, a plurality of magnets pivotally mounted on said mounting means wherein said magnets depend vertically on said mounting means between said side walls, the lower portion of each said magnet adapted to pivot about said mounting means between said side walls towards a magnetically attractable object.

2. The invention of claim 1 wherein said back wall and side walls form a U-shaped channel in said body portion, each of said magnets adapted to swing forward beyond the edge of said U channel sensitive to a magnetically attractable object.

3. The invention of claim 2 wherein each said magnet is in polarized relation with each adjacent magnet.

4. The invention of claim 1 wherein said mounting means are positioned on said back wall extending inward on said back wall between said side walls, each said magnet adapted to pivot laterally on said mounting means between said side walls.

5. The invention of claim 1 wherein said mounting means comprise a pin projecting inward on said back wall between said side walls and a spacer on said pin interposed between the inner surface of said back wall on each said magnet.

6. The invention of claim 1 wherein each said magnet further includes a strip of nonmagnetic material on one end thereof, each said magnet adapted to be pivotally mounted on said mounting means at said nonmagnetic strip end.

7. The invention of claim 1 wherein the width of each said magnet is less than the width of said side walls.

8. The invention of claim 1 wherein the length of each said magnet exceeds one-half the width of said back wall.

9. The invention of claim 1 wherein said elongated body is at least eight inches long.

10. The invention of claim 1 wherein each said magnet is approximately two inches long.

11. The invention of claim 1 wherein said back wall is transparent.

12. The invention of claim 1 wherein said body portion is closed at its upper and lower ends.

References Cited
UNITED STATES PATENTS

| | | | |
|---|---|---|---|
| 2,723,369 | 11/1955 | Brummett | 335—302 XR |
| 2,933,679 | 4/1960 | Bray | 335—302 XR |

BERNARD A. GILHEANY, *Primary Examiner.*

GEORGE HARRIS, *Examiner.*